United States Patent [19]
Maeda

[11] Patent Number: 5,847,842
[45] Date of Patent: *Dec. 8, 1998

[54] FACSIMILE APPARATUS HAVING PROTOCOL FOR IDENTIFYING MODEM TYPE

[75] Inventor: Toru Maeda, Mitaka, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 610,124

[22] Filed: Feb. 28, 1996

[51] Int. Cl.$^6$ .................................................. H04N 1/415
[52] U.S. Cl. ........................................ 358/434; 358/405
[58] Field of Search .................................. 358/400, 405, 358/407, 434, 435, 436, 438, 439, 440, 508; H04N 1/32

[56] References Cited

FOREIGN PATENT DOCUMENTS 07298027A 11/1995 Japan .............................. H04N 1/32

OTHER PUBLICATIONS

Procedures for Document Facsimile Transmissin in the General Switched Telephone Network (1988).

*Primary Examiner*—Thomas D. Lee
*Assistant Examiner*—Jerome Grant, II
*Attorney, Agent, or Firm*—Fitzpatrick, Cella, Harper & Scinto

[57] ABSTRACT

A facsimile apparatus capable of executing a first protocol for identifying a modem type includes a unit for determining, on the basis of a signal received in accordance with the first protocol, whether polling reception is to be performed, and a unit for transmitting a digital transmission command signal according to a T.30 protocol in accordance with determination by the determination unit.

17 Claims, 15 Drawing Sheets

FIG. 6

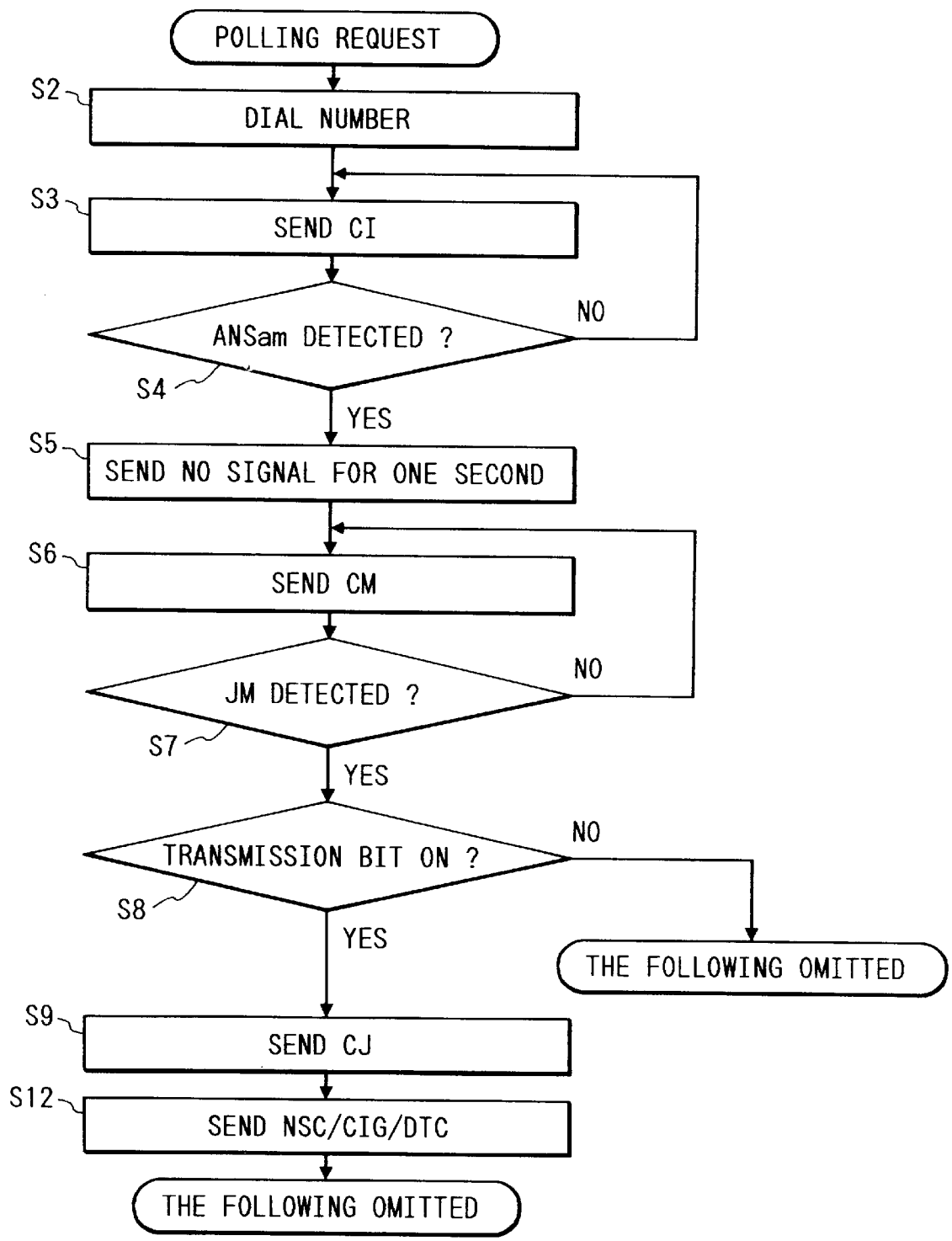

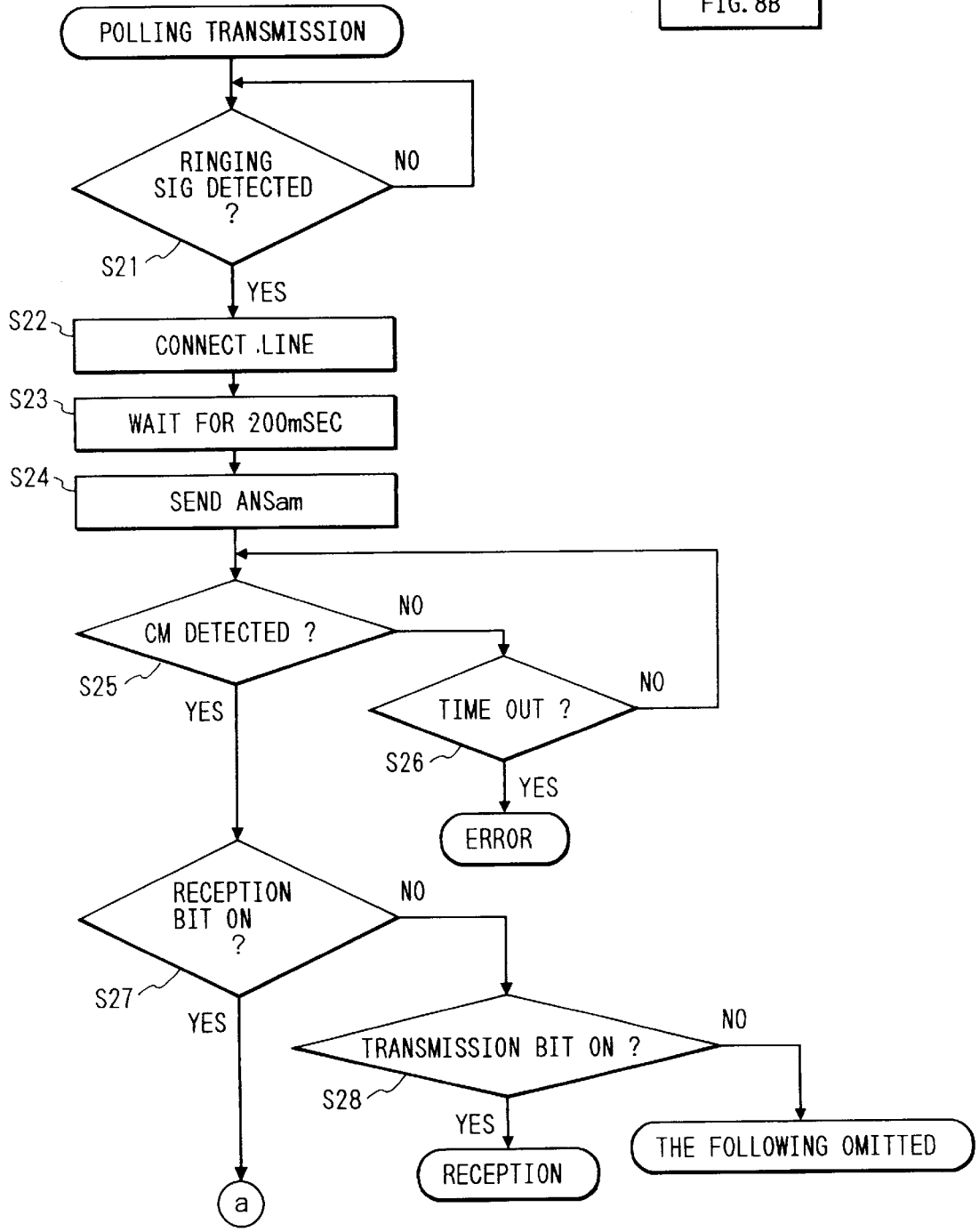

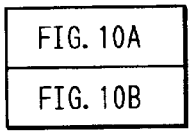
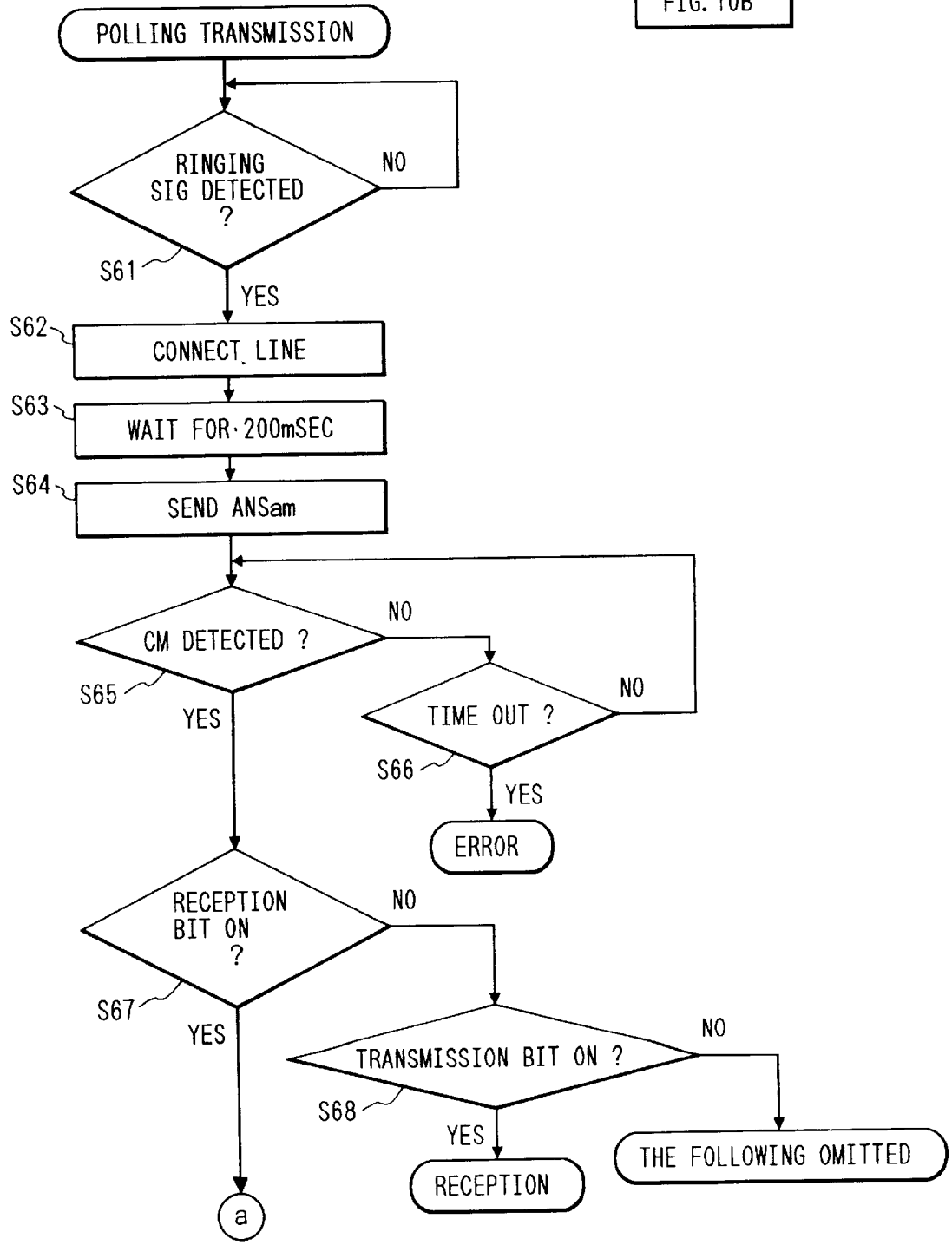
FIG. 10A

FIG. 11A
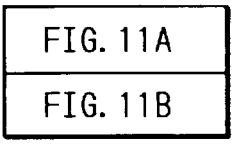
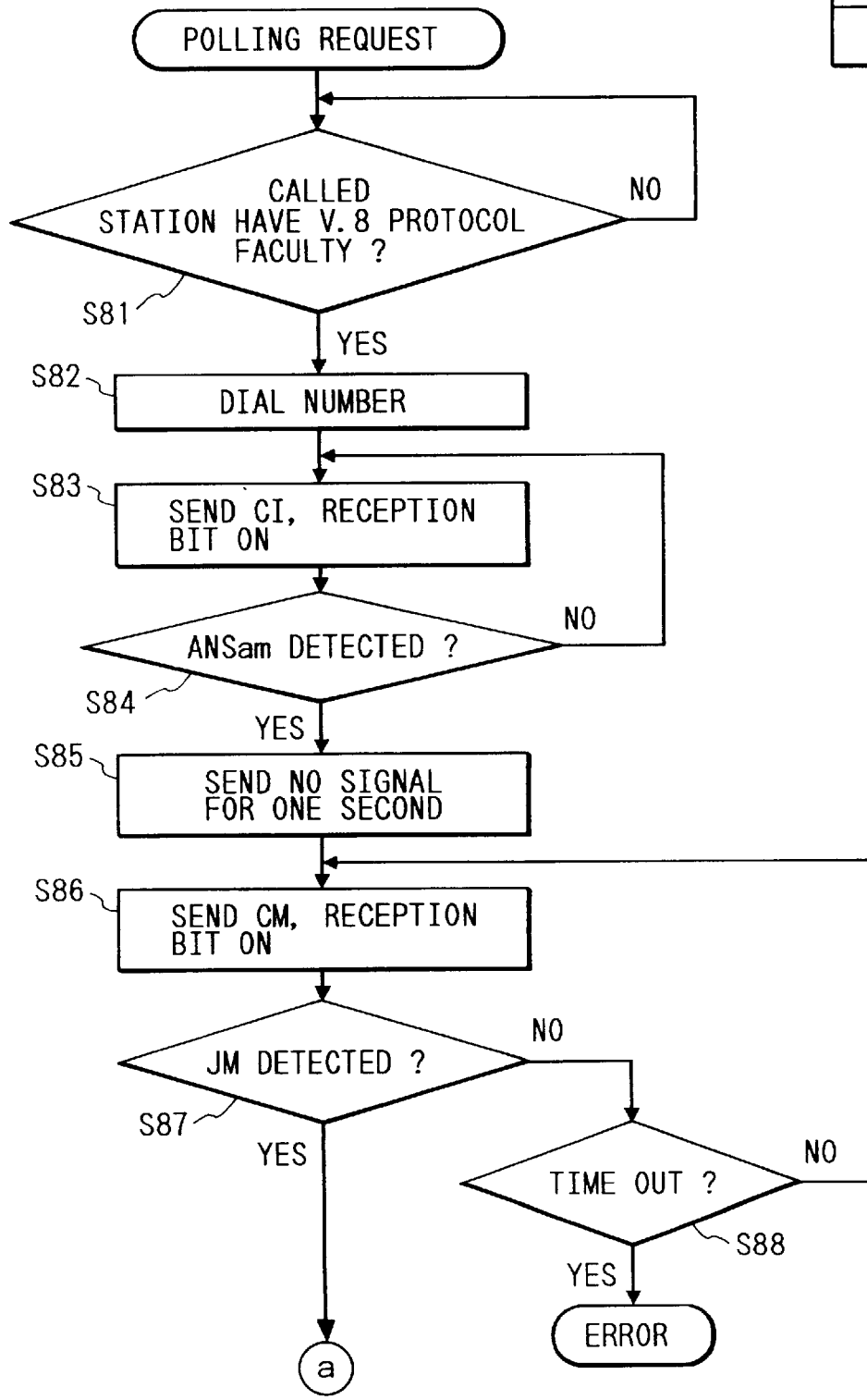

| FIG. 12A |
| FIG. 12B |

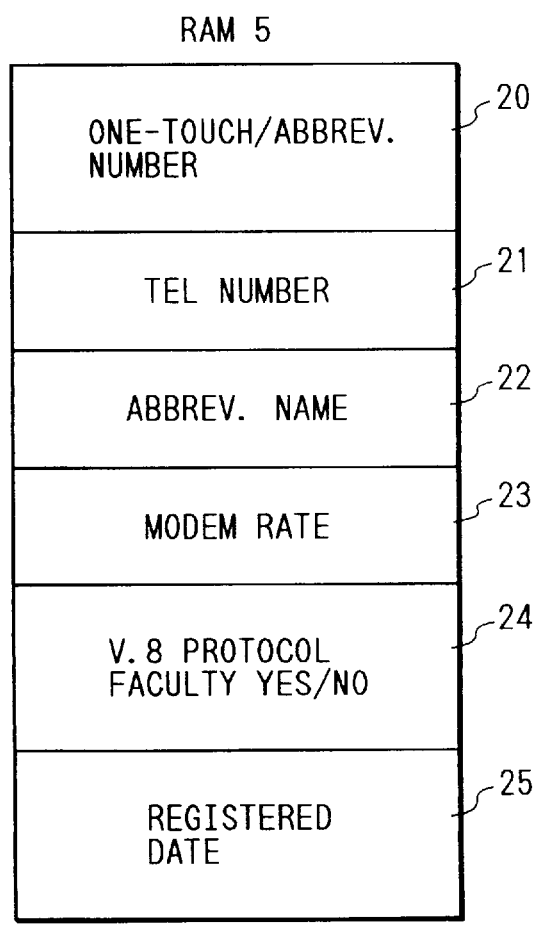

FACSIMILE APPARATUS HAVING PROTOCOL FOR IDENTIFYING MODEM TYPE

BACKGROUND OF THE INVENTION

1. Field of the Invention

The present invention relates to a facsimile apparatus having a protocol for identifying a modem type.

2. Related Background Art

In recent years, data communication using a computer such as a personal computer or image data communication using a facsimile apparatus is frequently performed through a general telephone line. Such communication is performed using modems of various types. Particularly, to perform data communication by computers, a transmission-side modem type must coincide with that on a reception side.

This raises a requirement for identifying a modem type and performing communication using a modem type common to the transmission side and the reception side, and the V.8 protocol is recommended by ITU-T (International Telecommunication Union-Telecommunication Sector).

In the G3 standards for facsimile communication, however, the T.30 protocol is recommended by ITU-T, so that facsimile communication is performed in accordance with this T.30 protocol.

When polling communication (communication in which a called station transmits data, and a calling station receives the data) is to be performed in accordance with the T.30 protocol, a protocol as shown in FIG. 2 is performed.

In FIG. 2, the calling station (polling receiver) originates a call and captures a line, and thereafter sends a CNG signal (Calling Tone), thereby notifying the called station of use of a non-speech terminal. The called station (polling transmitter) responds to call terminating and sends a CED signal (Called Station identification signal), and subsequently, an NSF signal (Non-Standard Facilities), a CSI signal (Called Subscriber Identification), and a DIS signal (Digital Identification Signal). The DIS signal is sent together with information representing that a transmission original is set. When the information representing the presence of the original is set in the DIS signal, the calling station transmits an NSC signal (Non-Standard Facilities Command), a CIG signal (Calling Subscriber Identification), and a DTC signal (Digital Transmit Command), thereby shifting to the polling communication mode. The called station selects a communication mode corresponding to the apparatus of its own from communication modes (transmission rates, pixel densities, and the like) set in the received NSC and DTC signals, and transmits an NSS signal (Non-Standard Facilities Set-Up), a TSI signal (Transmitting Subscriber Identification), and a DCS signal (Digital Command Signal), thereby designating the communication mode to the calling station. The called station transmits a TCF signal (Training Check) to check whether communication in the designated communication mode can be performed. Upon reception of a CFR signal (Confirmation to Receive) from the calling station, the called station performs image data communication to transmit the image of the prepared original.

To provide the V.8 protocol facility in a facsimile apparatus having the T.30 protocol and perform polling communication, a protocol as shown in FIG. 3 is considerable. First, a modem used for communication is determined in accordance with the V.8 protocol (V.21 modem is designated in the T.30 protocol). Thereafter, the same protocol after "A" in FIG. 2 is executed (signals used for the V.8 protocol will be described later). As shown in FIG. 3, when polling communication according to the T.30 protocol is only performed subsequent to the V.8 protocol, the communication time becomes longer as a whole than that of the prior art in FIG. 2.

SUMMARY OF THE INVENTION

The present invention has been made in consideration of the above problem, and has as its object is to improve a facsimile apparatus.

It is another object of the present invention to make the communication time as short as possible as a whole, when a V.8 protocol facility is provided and polling communication in facsimile communication is to be performed subsequent to the V.8 protocol.

It is still another object of the present invention to shorten the communication time as a whole by, in a protocol for identifying a modem type in line connection, notifying that polling communication is to be performed and simplifying the subsequent T.30 protocol.

It is still another object of the present invention to shorten the communication time as a whole by, in a protocol for identifying a modem type in line connection, notifying that polling communication is to be performed in accordance with a protocol faster than the T.30 protocol and performing polling communication in accordance with the fast protocol.

The other objects of the present invention will be apparent from the following description of embodiments and the accompanying drawings.

BRIEF DESCRIPTION OF THE DRAWINGS

FIG. 6 is a view showing the data structure of a V.8 protocol signal used in each of the above embodiments;

FIG. 7 is a flow chart showing an operation on a polling request side of the first embodiment;

FIG. 15 is a view showing a data structure in a RAM.

DETAILED DESCRIPTION OF THE PREFERRED EMBODIMENTS

The embodiments of the present invention will be described below in detail with reference to the accompanying drawings.

Figure 1:
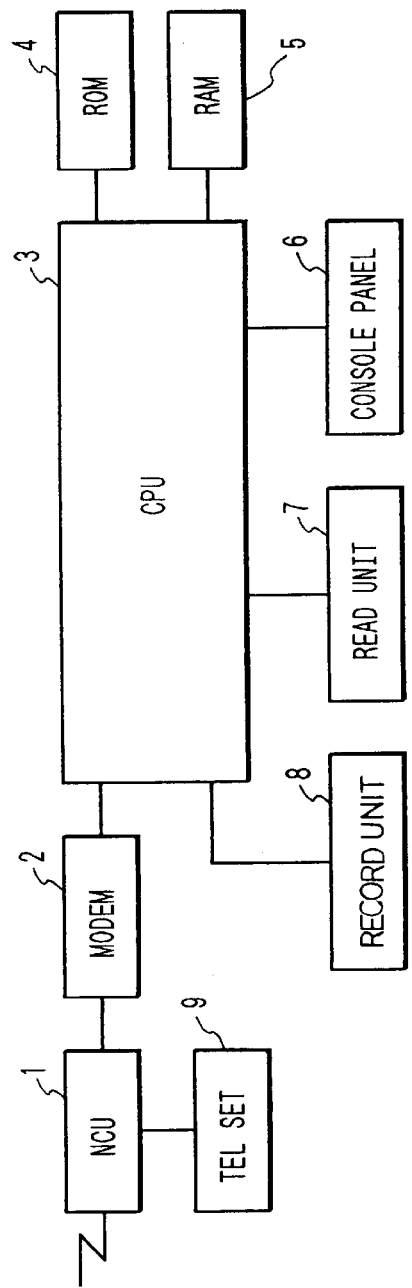
FIG. 1 is a block diagram showing the arrangement of a facsimile apparatus according to the embodiment.
Figure 2:
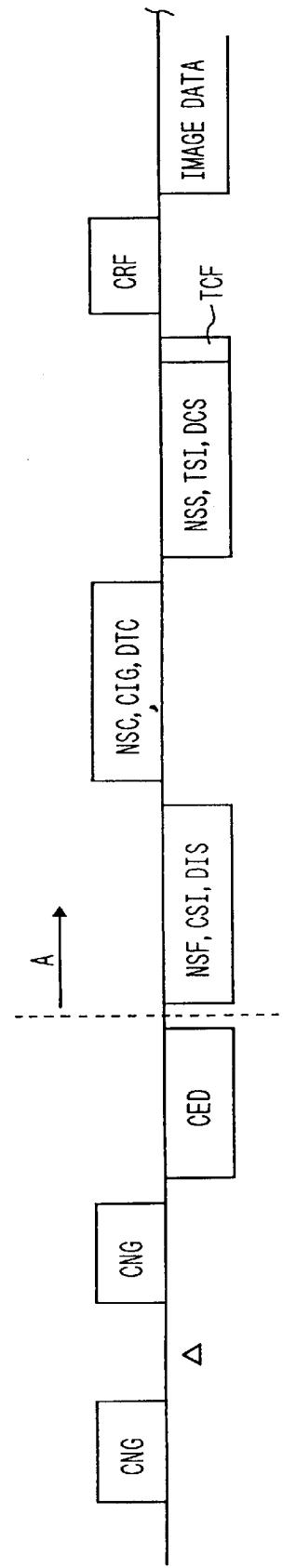
FIG. 2 is an explanatory view showing a conventional polling communication protocol.

FIG. 1 is a block diagram showing the arrangement of a facsimile apparatus according to the embodiment of the present invention.

A network control unit (NCU) 1 is a controller for controlling a public network. A modem 2 is a V.21/V.27ter/V.29/V.17/V.34 modem for modulating/demodulating digital and analog signals.

A CPU 3 controls the entire facsimile apparatus. A ROM 4 stores a control program for the CPU 3, and the like. A RAM 5 provides a work area for the CPU 3 and a storage area for receiver information and the like.

A console panel 6 has a keyboard which accepts various key operations, and an LCD display unit. A read unit 7 is a scanner device for reading an original by using an image pickup element such as a CCD. A record unit 8 is a printer unit for printing information on recording paper. A telephone set 9 for performing a telephone call is connected to this facsimile apparatus.

Signals used for the V.8 protocol of ITU-T will be described below.

(1) CI signal

A CI signal is a signal transmitted from a calling station at 300 bps via a V.21 low channel (L), representing the start of the V.8 protocol.

(2) ANSam signal

An Ansam signal is a signal having a frequency of 2,100 Hz, transmitted from a called station, phase-inverted every 450 ms and amplitude-modulated by 15 Hz, and representing that the V.8 facility is available.

(3) CM signal

A CM signal is a signal transmitted from the calling station at 300 bps via the V.21 (L), representing modem modulation.

(4) JM signal

A JM signal is a signal transmitted from the called station at 300 bps via a V.21 high channel (H) in correspondence to the detected CM signal, representing modem modulation.

(5) CJ signal

A CJ signal is a response signal transmitted from the calling station at 300 bps, representing the end of the CM signal upon detection of the JM signal.

The first embodiment will be described below in which transmission of the NSF, CSI, and DIS signals in FIG. 3 after the V.8 protocol is omitted.

FIG. 7 is a flow chart showing an operation on a polling request side (calling station) of the first embodiment.

The operator on the polling request side sets a polling request and depresses, e.g., the one-touch number of a partner station.

Figure 6:
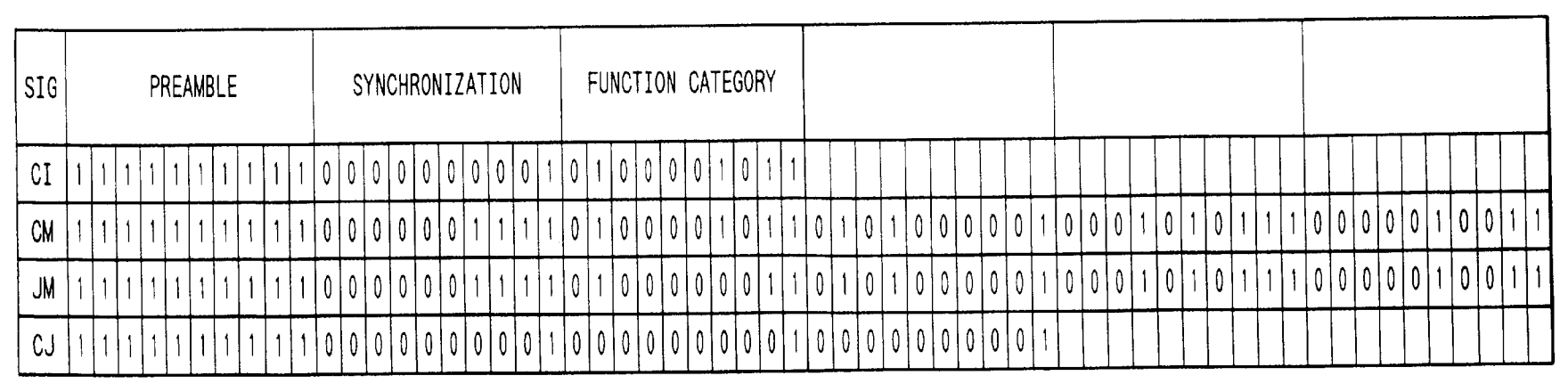

With this operation, the facsimile apparatus on the polling request side dials the number of the destination designated by the one-touch number to send a CI signal from the modem 2 (steps S2 and S3). As shown in FIG. 6, the CI sequence in the CI signal is constituted by a preamble consisting of 10 bits of "1" and "Call Function" representing facsimile reception.

When the modem 2 detects an ANSam signal from the polling transmission side (step S4), sending of the CI signal is stopped. No signal is sent for at least one second. Thereafter, a CM signal is sent from the modem (steps S5 and S6). As shown in FIG. 6, the CM sequence in the CM signal is constituted by a preamble consisting of 10 bits of "1", "Call Function" representing facsimile transmission, and bits representing the V.21/V.17/V.29/V.27ter modem modulation mode.

When the modem 2 detects a JM signal, and the transmission bit is ON, a CJ signal is sent (steps S7 to S9). As shown in FIG. 6, the CJ sequence in the CJ signal is constituted by a preamble consisting of 10 bits of "1", and three cycles of eight bits of "0" sandwiched between a start-bit of "0" and a stop-bit of "1".

NSC, CIG, and DTC signals are transmitted at 300 bps in accordance with the T.30 protocol (step S12). Subsequently, the same polling reception processing as in the prior art is performed.

Figure 8B:
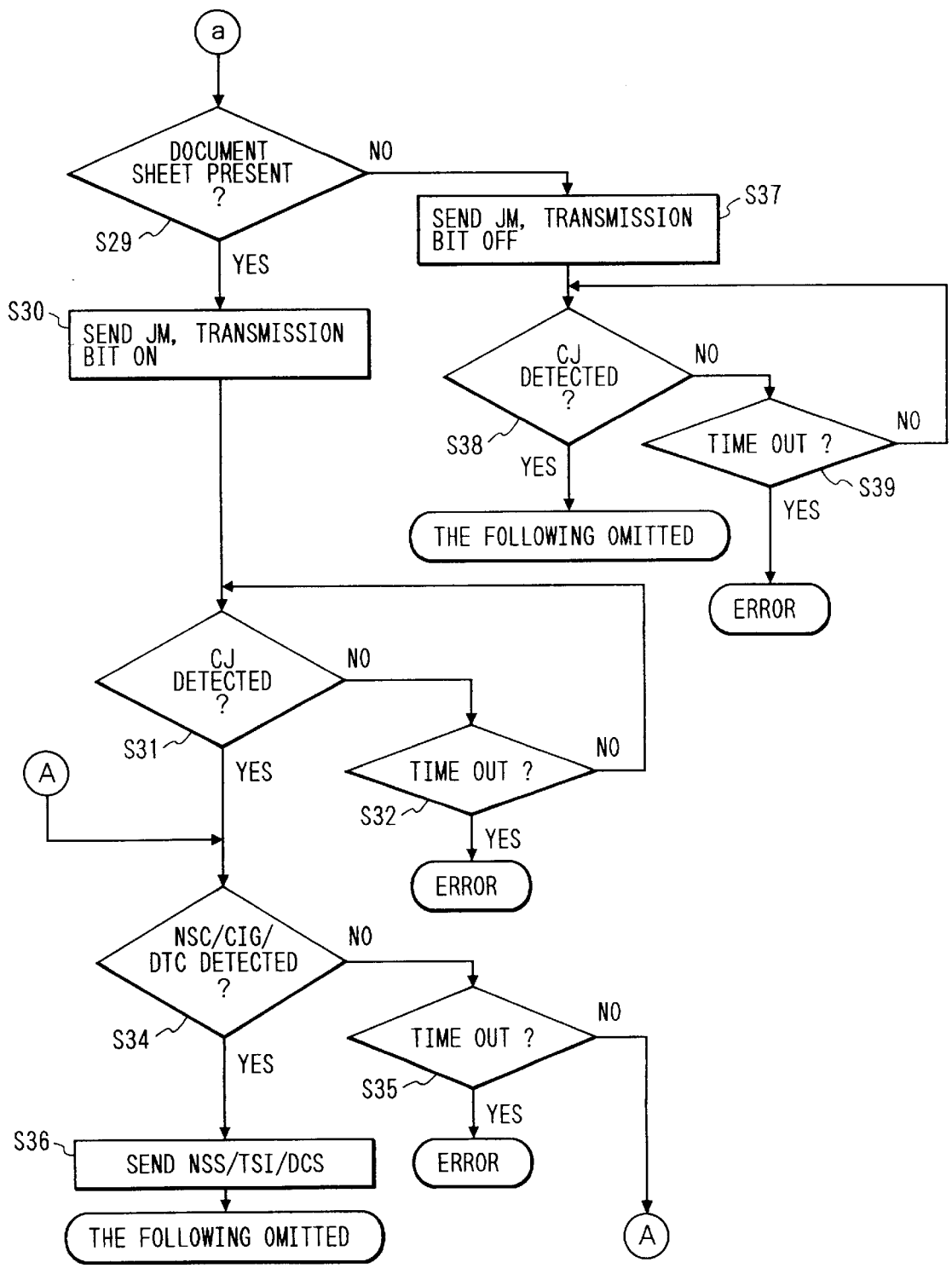
FIG. 8, composed of FIGS. 8A and 8B, is a flow chart showing an operation on a polling transmission side of the first embodiment.

FIGS. 8A and 8B depict flow charts showing an operation on the polling transmission side (called station) of the first embodiment.

The polling transmission side waits for detection of a ringing signal from the line by the NCU 1 (step S21). Upon detection of the ringing signal, the line is connected by the NCU 1 in accordance with the V.8 protocol (step S22). No signal is sent from the modem 2 for 0.2 second (step S23). Thereafter, the ANSam signal is transmitted (step S24).

Upon detection of the CM signal, the modem 2 confirms that the reception bit representing that the calling station is requesting polling transmission is ON, and a document sheet is present in the apparatus of its own, and transmits the JM signal (steps S25 to S30).

As shown in FIG. 6, the JM sequence in the JM signal is constituted by a preamble consisting of 10 bits of "1", "Call Function" representing facsimile transmission, and bits representing the V.21/V.17/V.29/V.27ter modem modulation mode.

When the modem 2 detects the CJ signal (steps S31 and S32), the NSC, CIG, and DTC signals at 300 bps in the T.30 protocol are detected (step S34). Upon reception of the NSC, CIG, and DCS signals at 300 bps in the T.30 protocol (steps S34 and S35), NSS, TSI, and DCS signals are sent (step S36). Subsequently, the normal operation is performed.

The subsequent processing is the same as in the prior art, and a detailed description thereof will be omitted.

Figure 3:
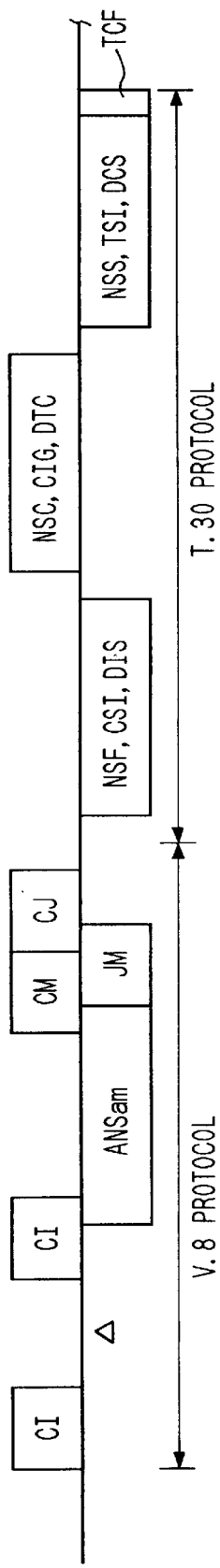
FIG. 3 is a view showing a protocol considerable when a polling communication protocol is to be performed subsequent to the V.8 protocol.
Figure 4:
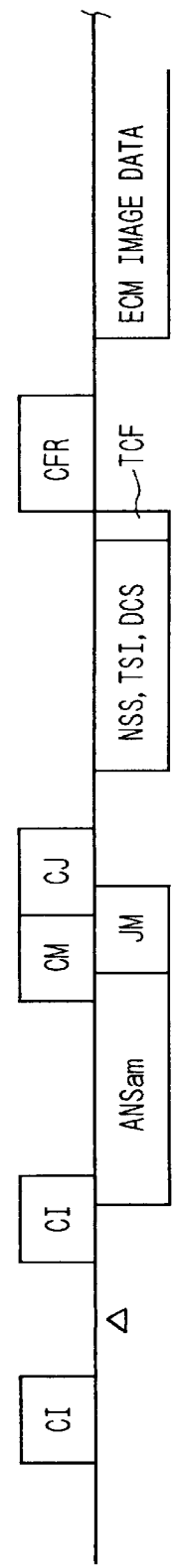
FIG. 4 is an explanatory view showing a communication protocol according to the second embodiment.

The second embodiment will be described below in which transmission of the NSF, CSI, and DIS signals and the NSC, CIG, and DIC signals in FIG. 3 is omitted. FIG. 4 is a view showing a communication protocol according to the second embodiment.

Figure 9:
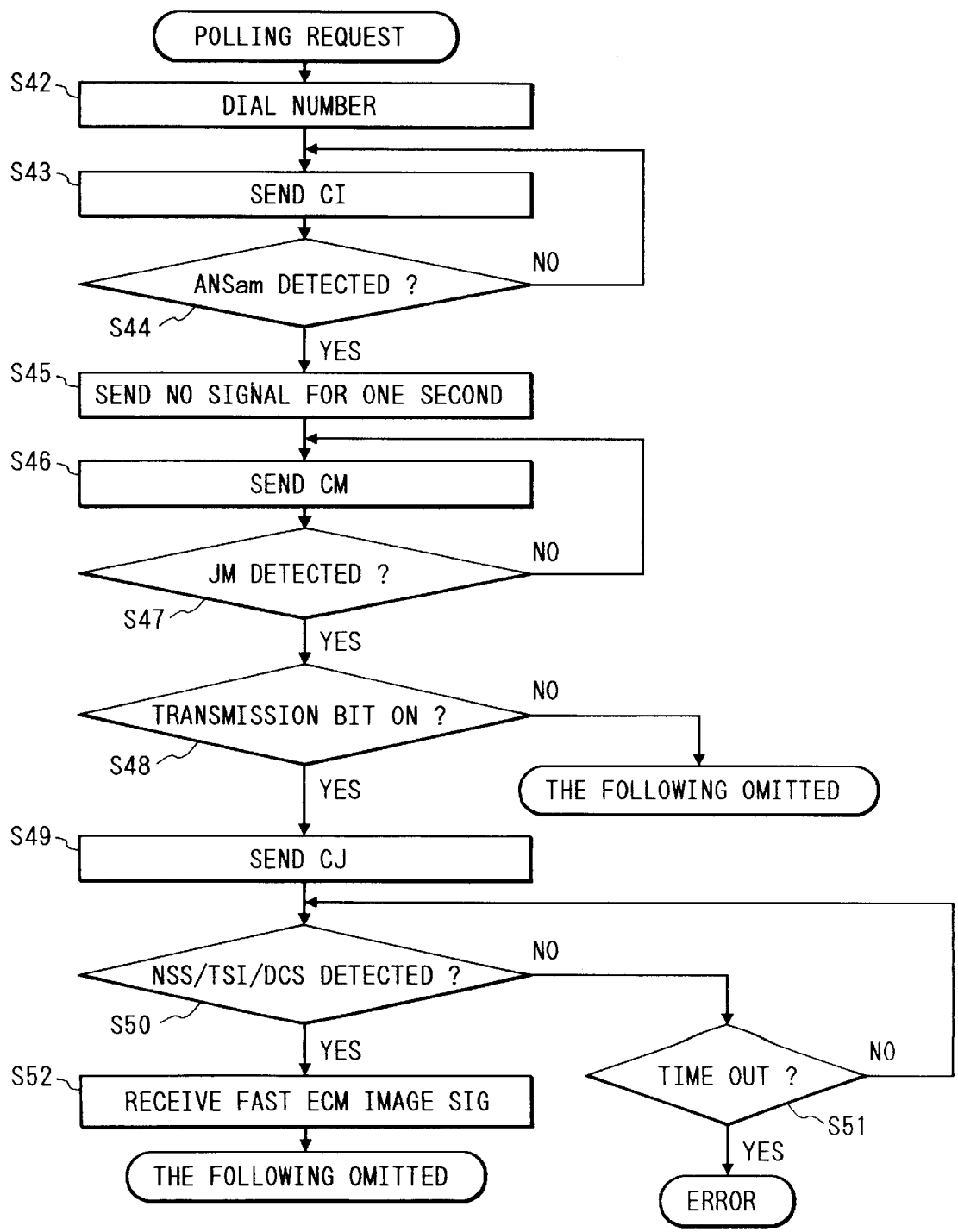
FIG. 9 is a flow chart showing an operation on a polling request side of the second embodiment.

FIG. 9 is a flow chart showing an operation on a polling request side (calling station) of the second embodiment.

The operator on the polling request side sets a polling request and depresses, e.g., the one-touch number of a partner station.

With this operation, the facsimile apparatus on the polling request side dials the number of the destination designated by the one-touch number to send a CI signal from a modem 2 (steps S42 and S43). As shown in FIG. 6, the CI sequence in the CI signal is constituted by a preamble consisting of 10 bits of "1" and "Call Function" representing facsimile reception.

When the modem 2 detects an ANSam signal from the polling transmission side (step S44), sending of the CI signal is stopped. No signal is sent for at least one second. Thereafter, a CM signal is sent from the modem (steps S45 and S46). As shown in FIG. 6, the CM sequence in the CM signal is constituted by a preamble consisting of 10 bits of "1", "Call Function" representing facsimile transmission, and bits representing the V.21/V.17/V29/V27ter modem modulation mode.

When the modem 2 detects a JM signal, and the transmission bit is ON, a CJ signal is sent (steps S47 to S49). As shown in FIG. 6, the CJ sequence in the CJ signal is constituted by a preamble consisting of 10 bits of "1", and three cycles of eight bits of "0" sandwiched between a start-bit of "0" and a stop-bit of "1".

NSS, TSI, and DCS signals at 300 bps in the T.30 protocol are received (steps S50 and S51). The transmission mode for the NSS, TSI, and DCS signals is determined on the basis of polling transmission information in the RAM 5. The modem 2 receives a fast image signal in the ECM mode (step S52).

The image signal is decoded on the basis of the transmission mode for the NSS, TSI, and DCS signals. Subsequently, the same polling reception processing as in the prior art is performed.

Figure 10B:
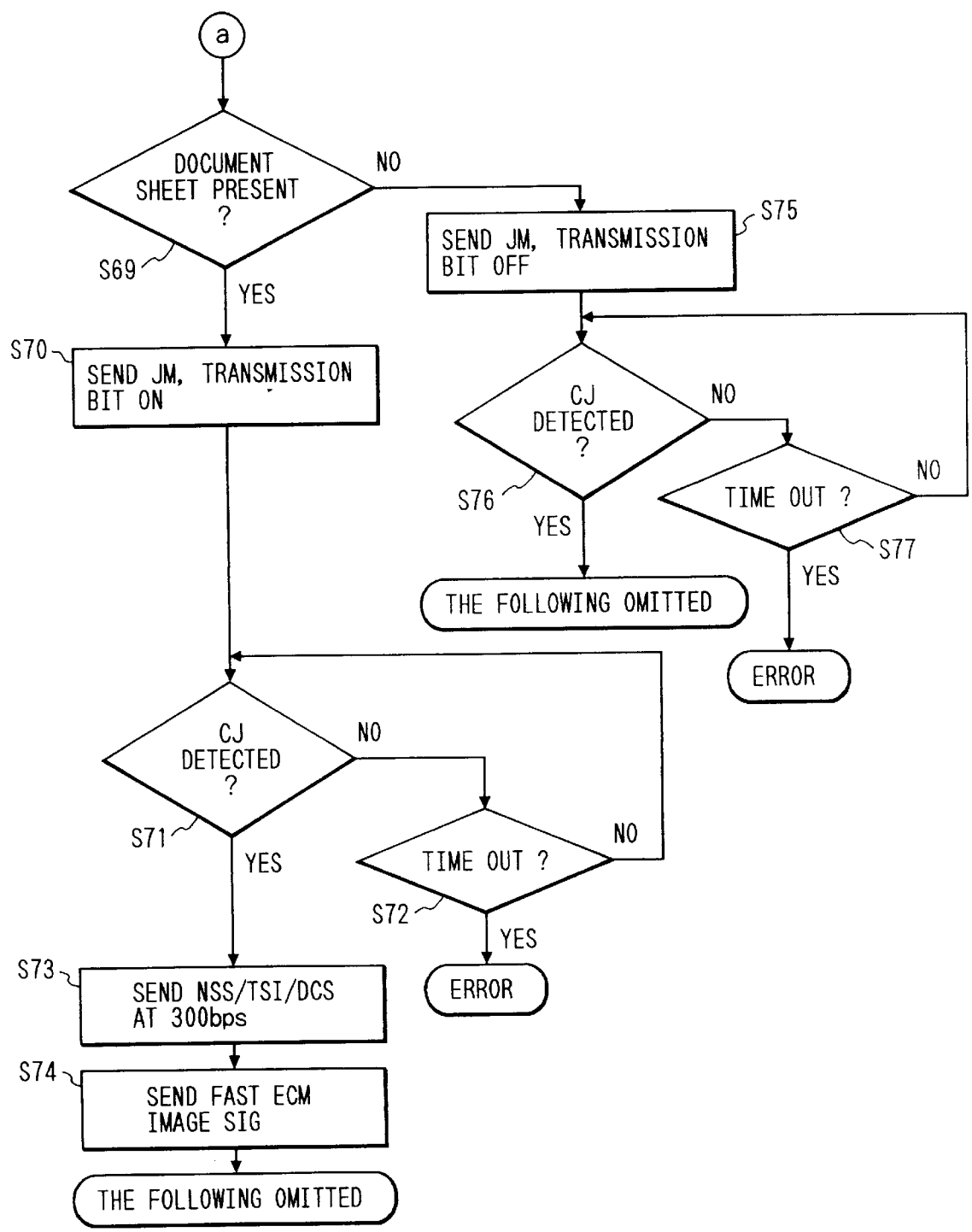
FIG. 10, composed of FIGS. 10A and 10B, is a flow chart showing an operation on a polling transmission side of the second embodiment.

FIGS. 10A and 10B depict flow charts showing an operation on the polling transmission side (called station) of the second embodiment.

The polling transmission side waits for detection of a ringing signal from the line by the NCU 1 (step S61). Upon detection of the ringing signal, the line is connected by the NCU 1 in accordance with the V.8 protocol (step S62). No signal is sent from the modem 2 for 0.2 second (step S63). Thereafter, the ANSam signal is transmitted (step S64).

Upon detection of the CM signal, the modem 2 confirms that the reception bit representing that the calling station is requesting polling transmission is ON, and a document sheet is present in the apparatus of its own, and transmits the JM signal (steps S65 to S70).

As shown in FIG. 6, the JM sequence in the JM signal is constituted by a preamble consisting of 10 bits of "1", "Call Function" representing facsimile transmission, and bits representing the V.21/V.17/V.29/V.27ter modem modulation mode.

When the modem 2 detects the CJ signal (steps S71 and S72), the NSS, TSI, and DCS signals at 300 bps in the T.30 protocol are transmitted (step S73), and the fast image signal is transmitted in the ECM mode (step S74). The image data is coded on the basis of the NSS, TSI, and DCS signals from the transmitter.

The subsequent processing is the same as in the prior art, and a detailed description thereof will be omitted.

Figure 5:
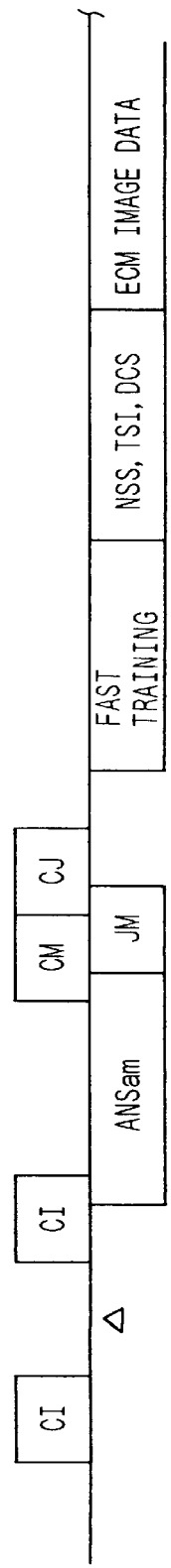
FIG. 5 is an explanatory view showing a communication protocol according to the third embodiment.

The third embodiment will be described below in which, after the V.8 protocol, image data communication is performed using a fast modem (V.27ter, V.29, V.17, or the like) for performing image data communication after transmission of a training signal and NSS, TSI, and DCS signals. FIG. 5 is a view showing a communication protocol according to the third embodiment.

Figure 11B:
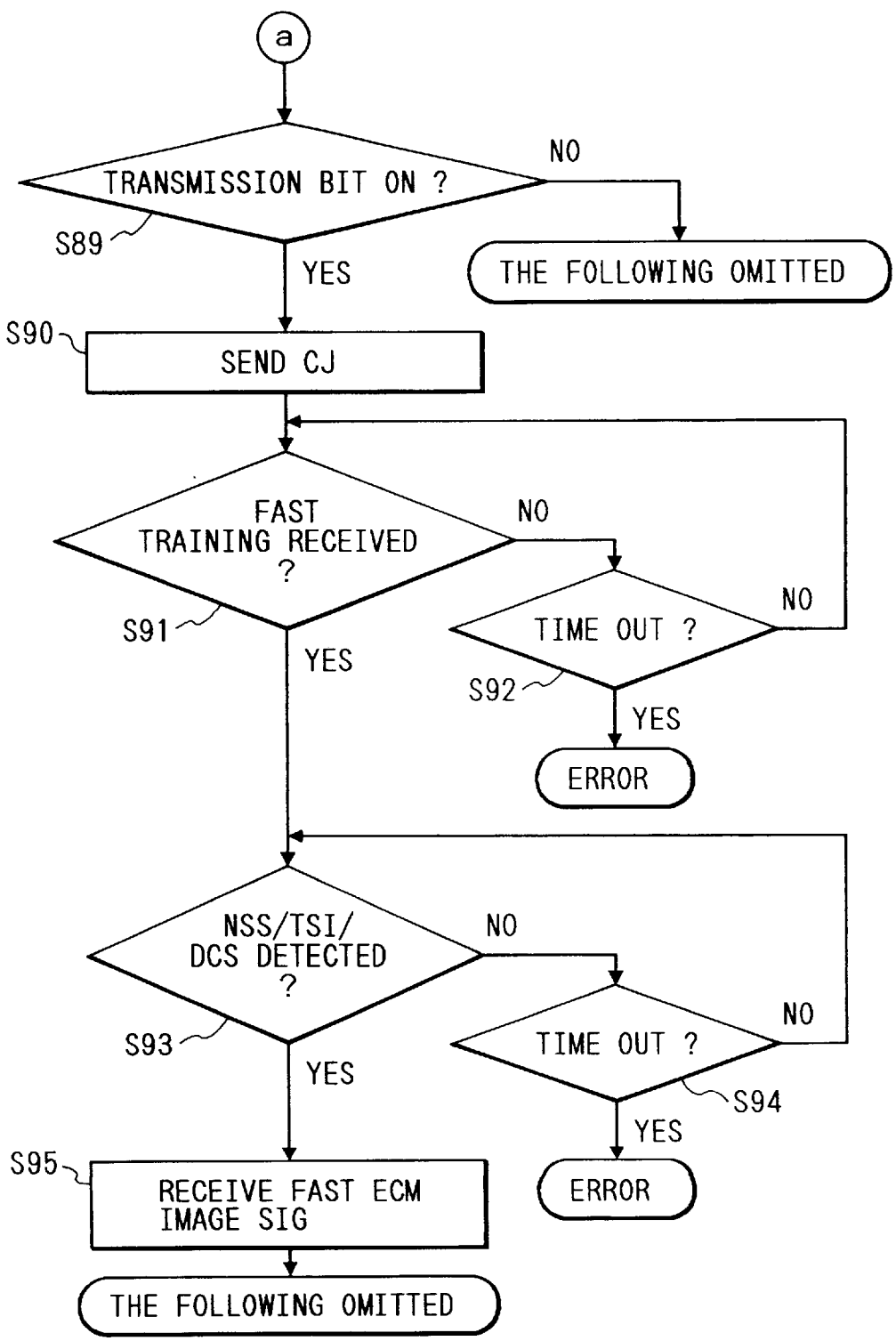
FIG. 11, composed of FIGS. 11a and 11B, is a flow chart showing an operation on a polling request side of the third embodiment.

FIGS. 11A and 11B depict flow charts showing an operation on a polling request side of the third embodiment.

The polling request side sets a polling request and depresses the one-touch number of a partner station, which is registered in advance. In the third embodiment, previous communication with the partner station has already been performed, and the information of the polling transmission side is stored in the RAM 5.

FIG. 15 is an explanatory view showing the content of the RAM 5. As shown in FIG. 15, a telephone number 21 of the partner, an abbreviated name 22, a modem rate 23, V.8 protocol facility yes/no information 24, and a registered date 25 are registered in correspondence with a one-touch/abbreviated number 20.

The polling request side checks, from the polling transmission side information in the RAM 5, whether the polling transmission side can execute the V.8 protocol. If the V.8 protocol can be executed, the following protocol is started (step S81).

The calling station dials the number of the destination designated by the one-touch number (step S82), and sends a CI signal from a modem 2 (step S83). As shown in FIG. 6, the CI sequence in the CI signal is constituted by a preamble consisting of 10 bits of "1" and "Call Function" representing facsimile reception.

When the modem 2 detects an ANSam signal from the polling transmission side, sending of the CI signal is stopped (step S84). No signal is sent for at least one second. Thereafter, a CM signal is sent from the modem (steps S85 and S86).

As shown in FIG. 6, the CM sequence in the CM signal is constituted by a preamble consisting of 10 bits of "1", "Call Function" representing facsimile transmission, and bits representing the V.21/V.17/V29/V27ter modem modulation mode.

When the modem 2 detects a JM signal, a CJ signal is sent (steps S87 to S90). As shown in FIG. 6, the CJ sequence in the CJ signal is constituted by a preamble consisting of 10 bits of "1", and three cycles of eight bits of "0" sandwiched between a start-bit of "0" and a stop-bit of "1".

After the CJ signal is sent, no signal is sent for 75 ms. Thereafter, the modem 2 receives a fast training signal corresponding to the value of the modem modulation mode represented by the JM signal (steps S91 and S92). The modem 2 further receives NSS, TSI, and DCS signals as fast signals (steps S93 and S94).

On the basis of the polling transmission side information in the RAM 5, the transmission mode for the NSS, TSI, and DCS signals is determined. A fast image signal is received in the ECM mode (step S95). The image signal is decoded on the basis of the transmission mode for the NSS, TSI, and DCS signals. Subsequently, the same polling reception processing as in the prior art is performed.

Figures 12, 12A:
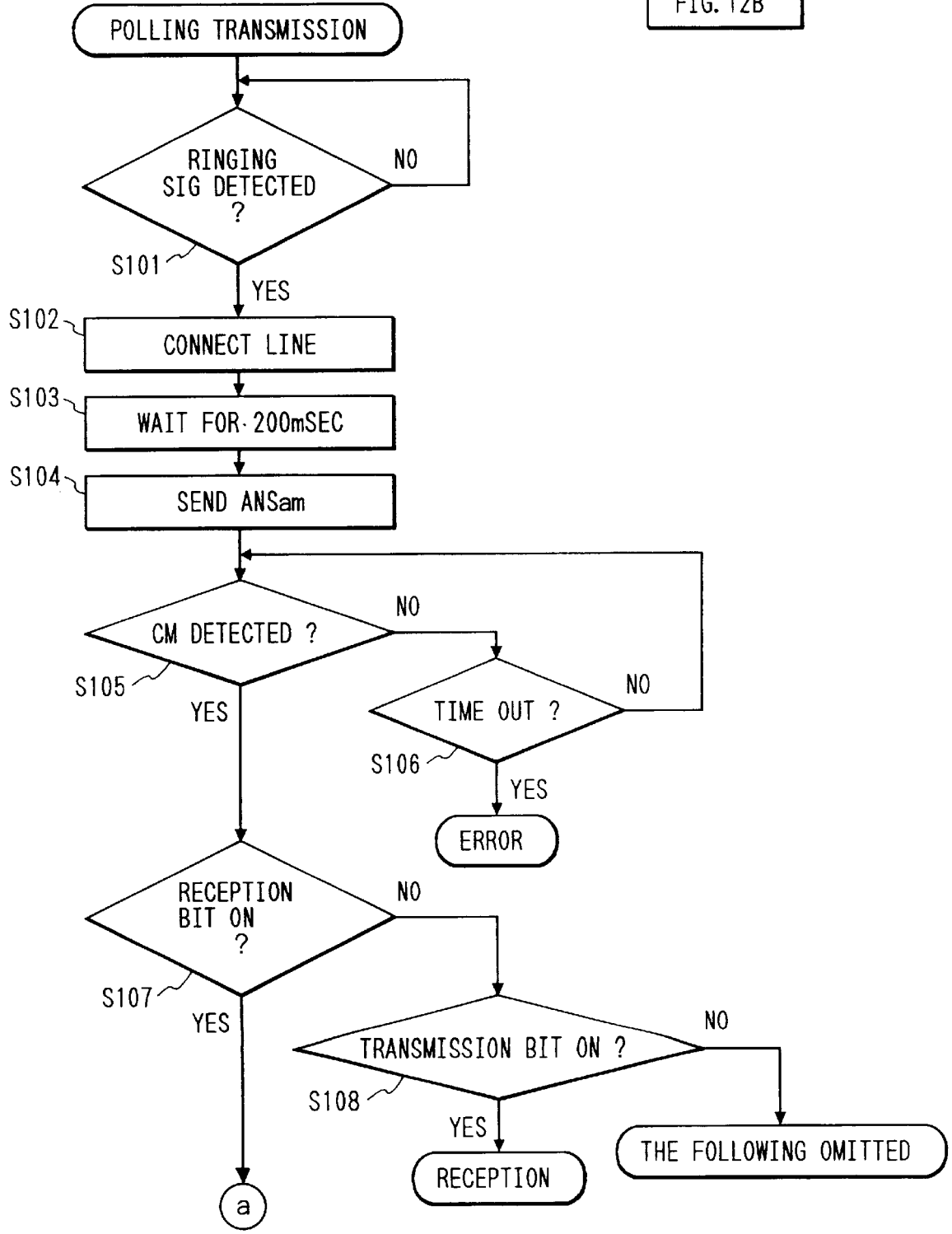
FIG. 12, composed of FIGS. 12A and 12B, is a flow chart showing an operation on a polling transmission side of the third embodiment.
Figure 12B:
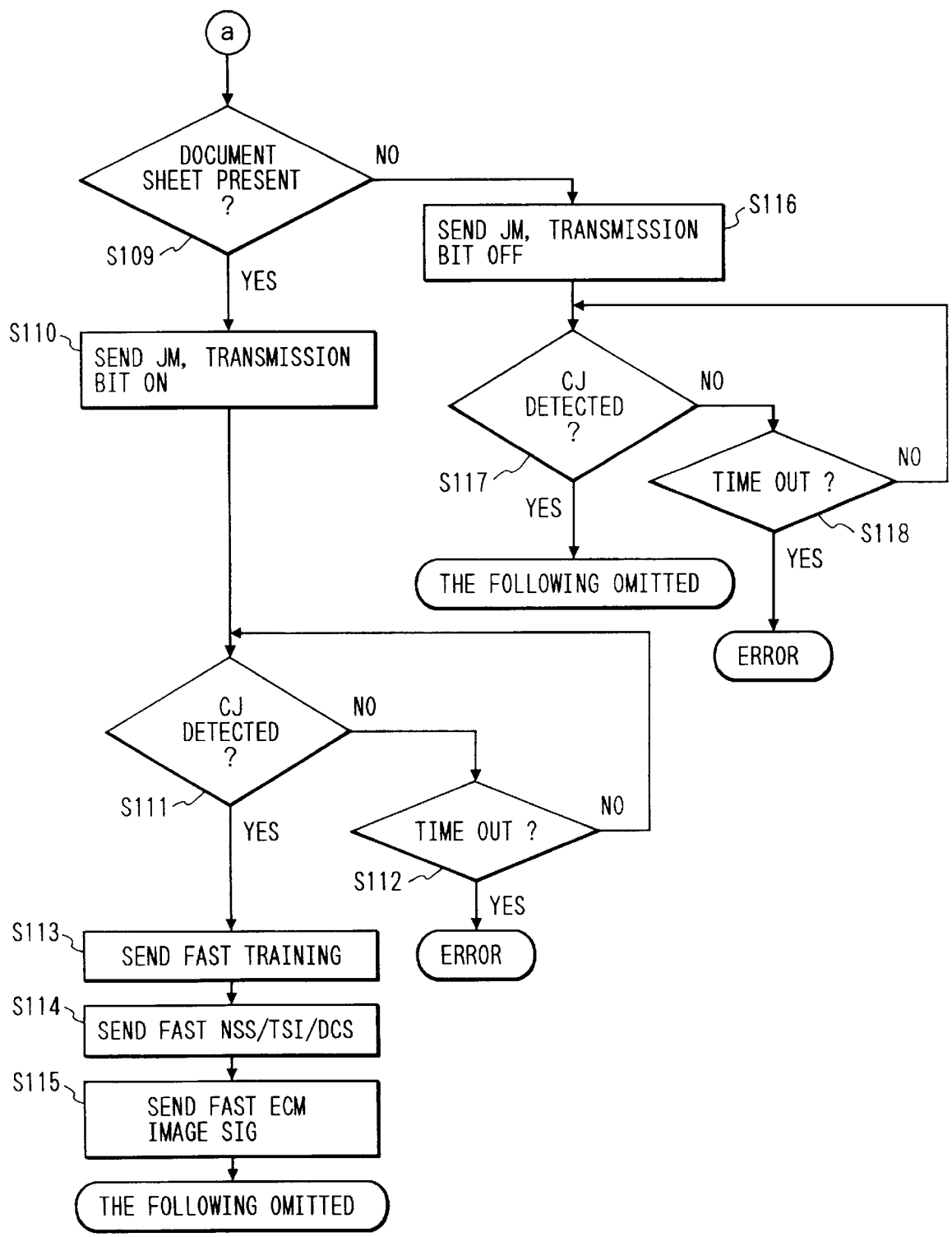

FIGS. 12A and 12B depict flow charts showing an operation on the polling transmission side of the third embodiment.

The polling transmission side waits for detection of a ringing signal from the line by the NCU 1 (step S101). Upon detection of the ringing signal, the line is connected by the NCU 1 in accordance with the V.8 protocol (step S102). No signal is sent from the modem 2 for 0.2 second (step S103). Thereafter, the ANSam signal is transmitted (step S104).

Upon detection of the CM signal, the modem 2 confirms that the reception bit representing that the calling station is requesting polling transmission is ON, and a document sheet is present in the apparatus of its own, and transmits the JM signal (steps S105 to S110).

As shown in FIG. 6, the JM sequence in the JM signal is constituted by a preamble consisting of 10 bits of "1", "Call Function" representing facsimile transmission, and bits representing the V.21/V.17/V.29/V.27ter modem modulation mode.

When the modem 2 detects the CJ signal, the fast training signal is transmitted in the modem modulation mode transmitted by the JM signal (steps S111 to S113). After the fast training signal is transmitted, the NSS, TSI, and DCS signals as fast signals are transmitted (step S114). Thereafter, the fast image signal is transmitted in the ECM mode (step S115).

The image data is coded on the basis of the NSS, TSI, and DCS signals from the transmitter. The subsequent polling transmission processing is the same as in the prior art, and a detailed description thereof will be omitted.

Figure 13:
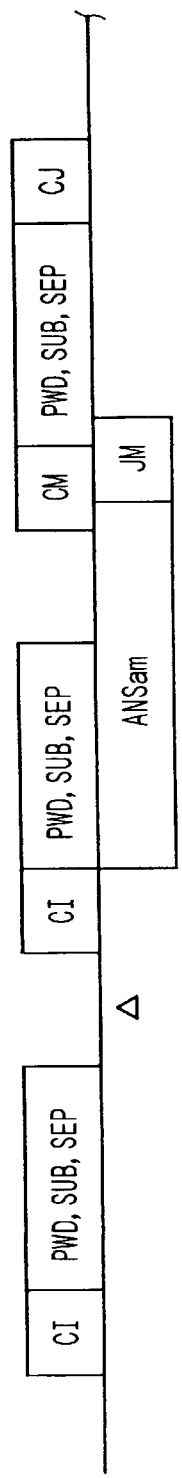
FIG. 13 is a view showing a modification of the communication protocol.

As a modification of each of the above embodiments, polling request information (PWD, SUB, and SEP signals) may be transmitted after the V.8 signal, as shown in FIG. 13. The PWD signal is a password signal recommended in the T.30 protocol. The SUB signal is a sub-address signal recommended in the T.30 protocol. The SEP signal is a selective polling signal. These signals are used to enable/disable polling communication and select image data subjected to polling communication.

Figure 14:
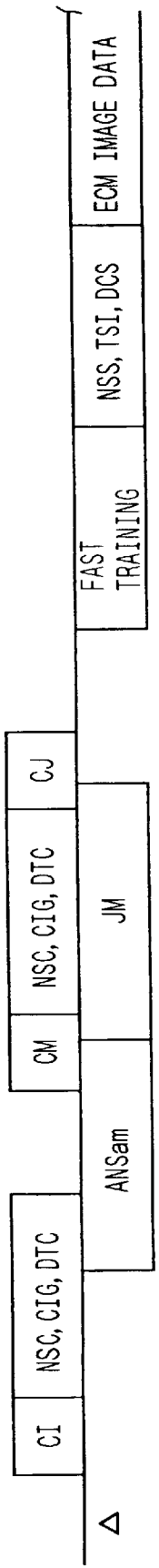
FIG. 14 is a view showing another modification of the communication protocol.

As another modification of each of the above embodiments, polling request information (NSC, CIG, and DTC signals) may be transmitted after the V.8 signal, as shown in FIG. 14.

According to each of the above embodiments and modifications, the communication time can be shortened as a whole.

The present invention is not limited to the above-described embodiments, and various changes and modifications can also be made.

What is claimed is:

1. A facsimile apparatus capable of executing a V.8 protocol for identifying a modem type, comprising:
   means for determining, on the basis of a signal received in accordance with the V.8 protocol, whether polling reception is to be performed; and
   means for transmitting a digital transmission command signal according to a T.30 protocol in accordance with determination by said determination means.

2. A facsimile apparatus capable of executing a first protocol for identifying a modem type, comprising:
   means for determining, on the basis of a signal received in accordance with the first protocol, whether polling reception is to be performed; and
   means for transmitting a digital transmission command signal according to a T.30 protocol in accordance with determination by said determination means,
   wherein the first protocol is a V.8 protocol, and said determination means determines on the basis of a JM signal whether polling reception is to be performed.

3. A facsimile machine capable of executing a V.8 protocol for identifying a modem type, comprising:
   detection means for detecting a presence/absence of polling transmission data;
   means for transmitting a signal of the V.8 protocol including information representing the presence of the polling transmission data, in accordance with detection by said detection means; and
   means for performing polling transmission upon reception of a digital transmission command signal of a T. 30 protocol.

4. A facsimile apparatus capable of executing a first protocol for identifying a modem type, comprising:
   detection means for detecting a presence/absence of polling transmission data;
   means for transmitting a signal of the first protocol including information representing the presence of the polling transmission data, in accordance with detection by said detection means; and
   means for performing polling transmission upon reception of a digital transmission command signal of a T.30 protocol,
   wherein the first protocol is a V.8 protocol, and the signal of the first protocol is a JM signal.

5. A facsimile communication method for executing a T.30 protocol after a first protocol for identifying a modem type is executed, comprising the steps of:
   notifying a presence/absence of polling transmission data in accordance with the first protocol; and
   performing polling communication while omitting transmission/reception of a digital identification signal of the T.30 protocol,
   wherein the first protocol is a V.8 protocol, and the presence/absence of the polling transmission data is notified by a JM signal.

6. A facsimile communication method for executing a T.30 protocol after a V.8 protocol for identifying a modem type is executed, comprising the steps of:
   notifying a presence/absence of polling transmission data in accordance with the V.8 protocol; and
   performing polling communication while omitting transmission/reception of a digital identification signal of a T.30 protocol.

7. A method according to claim 6, wherein the signal of the T.30 protocol is transmitted in accordance with the V.8 protocol.

8. A method according to claim 7, wherein the signal of the T.30 protocol is any one of a password signal, a sub-address signal, and a selective polling signal.

9. A method according to claim 7, wherein the signal of the T.30 protocol signal is a digital transmission command signal.

10. A facsimile communication method for executing a T.30 protocol after a V.8 protocol for identifying a modem type is executed, comprising the steps of:
    notifying a presence/absence of polling transmission data in accordance with the V.8 protocol; and
    performing polling communication while omitting transmission/reception of a digital identification signal and a digital transmission command signal of a T. 30 protocol.

11. A method according to claim 10, wherein the signal of the T.30 protocol is transmitted in accordance with the V.8 protocol.

12. A method according to claim 11, wherein the signal of the T.30 protocol is any one of a password signal, a sub-address signal, and a selective polling signal.

13. A method according to claim 11, wherein the signal of the T.30 protocol signal is a digital transmission command signal.

14. A facsimile communication method for performing polling communication after a V.8 protocol for identifying a modem type is executed, comprising the steps of:
    registering information associated with a facility of an apparatus of a partner station in advance;
    notifying a presence/absence of polling transmission data in accordance with the V.8 protocol; and
    transmitting a digital transmission command signal of a T. 30 protocol by using a fast data communication modem on the basis of the registered information, thereby performing polling communication.

15. A method according to claim 14, wherein the signal of the T.30 protocol is transmitted in accordance with the V.8 protocol.

16. A method according to claim 15, wherein the signal of the T.30 protocol is any one of a password signal, a sub-address signal, and a selective polling signal.

17. A method according to claim 15, wherein the signal of the T.30 protocol signal is a digital transmission command signal.

* * * * *

UNITED STATES PATENT AND TRADEMARK OFFICE
CERTIFICATE OF CORRECTION

PATENT NO. : 5,847,842

DATED : December 8, 1998

INVENTOR(S) : TORU MAEDA

It is certified that error appears in the above-identified patent and that said Letters Patent is hereby corrected as shown below:

```
     On the title page: Item
[30] FOREIGN APPLICATION PRIORITY DATA

Insert: --[30] Foreign Application Priority Data
              February 28, 1995 [JP] Japan ... 7-64721--.

[56] REFERENCES CITED IN OTHER PUBLICATIONS

"Transmissin" should read --Transmission--.
```

This certificate supersedes Certificate of Correction issued January 4, 2000.

Signed and Sealed this

Eighteenth Day of April, 2000

Attest:

Q. TODD DICKINSON

*Attesting Officer*     *Director of Patents and Trademarks*